United States Patent

Yamajima

[15] 3,655,003

[45] Apr. 11, 1972

[54] WEIGHING MACHINE

[72] Inventor: Kaneo Yamajima, Tokyo, Japan

[73] Assignee: Kabushiki Kaisha Tanita Seisakusho, Tokyo-to, Japan

[22] Filed: Sept. 23, 1970

[21] Appl. No.: 74,684

[52] U.S. Cl............................177/173, 177/177, 177/210, 177/245
[51] Int. Cl..............................G01g 23/30, G01g 19/413
[58] Field of Search......................177/34, 48, 164, 173, 177, 177/210, 211, 245, 264

[56] References Cited

UNITED STATES PATENTS

| | | | |
|---|---|---|---|
| 659,910 | 10/1900 | Baldwin | 177/245 X |
| 1,446,552 | 2/1923 | Dunn | 177/177 |
| 1,869,438 | 8/1932 | Reeves et al | 177/177 |

*Primary Examiner*—Robert S. Ward, Jr.
*Attorney*—Steinberg & Blake

[57] ABSTRACT

A weighing machine comprising a platform on which an individual stands, and a base for supporting the platform through a weighing mechanism. A movable contact is adapted to be rotated in unison with a weight scale disc which is, in turn, rotatable by an amount in proportion to the load placed on the platform, a plurality of slidable contact plates being opposed to the movable contact, and a plurality of lamps being adapted to be separately lit as the contact is rotated through engagement with the slidable contact plates. And an adjustable height scale ring is arranged in concentric relation with the weight scale disc peripherally bearing a height scale and carrying the slidable contact plates, with which a weighted person may recognize at a glance the interrelation between an actual weight of the weighed person and the optimum weight relative to a particular height of the weighed person according to a lit lamp and the lamp corresponding to the optimum weight through operation of manually coordinating the height scale ring to the weight of the weighed person.

9 Claims, 3 Drawing Figures

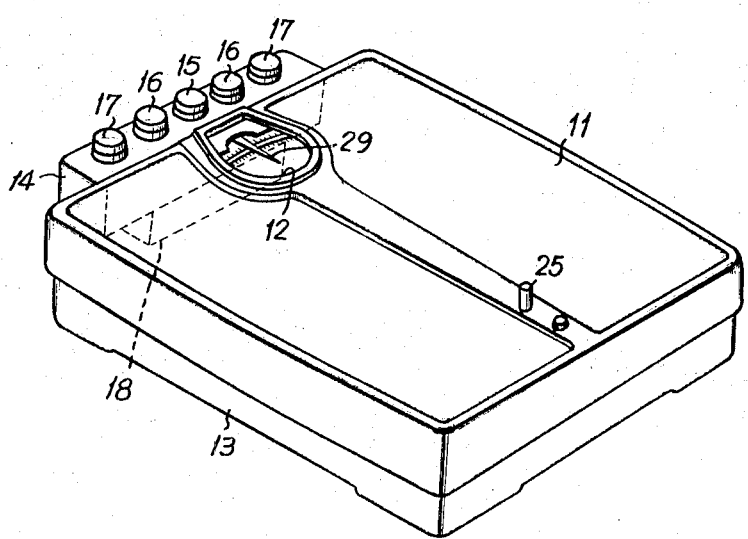

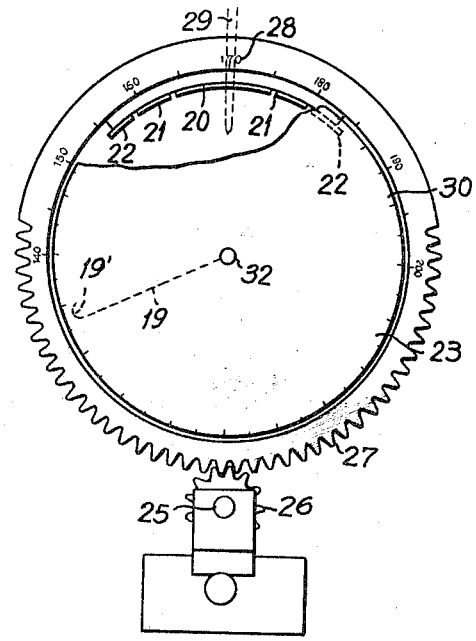
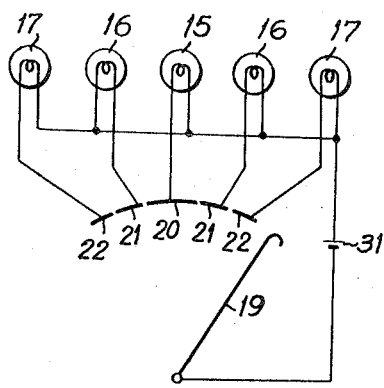
INVENTOR
KANEO YAMAJIMA
BY
Steinberg & Blake
ATTORNEYS

WEIGHING MACHINE

BACKGROUND OF THE INVENTION

A weighing machine is well known of which a part bears an indication of the optimum relation between height and weight in the human body by which it is possible to calculate the relation between the actual weight and height of the weighed person and the optimum interrelation. This comparison, however, is usually accomplished on the basis of a comparison scale provided on a part of the weighing machine. With such a weighing machine, therefore, the weighed person has had to read anew his or her own weight on the comparison scale after determining his or her own weight. It would be very convenient for the weighed person if the interrelation between his or her own actual weight and the optimum weight for his or her own actual height can be recognized in concurrence with weighing and it is extremely desirable that the degree of over or under weight relative to the optimum weight can be recognized.

SUMMARY OF THE INVENTION

The first object of the present invention is to provide a weighing machine having a weighing mechanism adapted to indicate the optimum relation between height and weight, wherein lighting of lamps indicates legibly and clearly whether the weight of a weighed person is optimum for his or her height.

The second object of the invention is to provide a weighing machine adapted to indicate through said lighting of lamps whether an actual weight of the weighed person is optimum or not and at the same time to indicate a degree of over or under weight according to the position of the particular lamp which is lit.

The third object of the invention is to provide the weighing machine as mentioned above wherein the lamps are of different colors for easy and clear indication.

The fourth object of the invention is to provide the weighing machine as mentioned above wherein in a scale plate bearing a height scale is provided separately of the weight scale plate so that each of many weighed persons may individually adjust the height scale plate to his or her own height in individual weighing.

The fifth and final object of the invention is to make the appearance of the machine more attractive and to interest the user through lighting of lamps.

The other objects of the invention will be understood from reading the detailed description of the specification with reference to the annexed drawing.

According to the present invention, these objects are achieved by a plurality of lamps symmetrically arranged on one side of the platform relative to a center lamp which indicates the optimum value, the height scale plate or ring rotatably mounted in concentric relation with the weight scale plate so as to be manually positioned, a plurality of slidable contact plates on this height scale plate being connected to said lamps, respectively, and a movable contact secured to the weight scale plate being brought into contact with said slidable contact plates so as to light the corresponding lamp. Approximate amount of over or under weight in comparison with the optimum value can be recognized at a glance according to the position of a lamp which is lit relative to the center lamp indicating the optimum value by limiting the effective contact range of each slidable contact plate to a predetermined amount of the weight scale plate, for example, to 5 kg.

BRIEF DESCRIPTION OF DRAWINGS

A preferred embodiment of the weighing machine according to the present invention will be shown by the annexed drawing in which:

FIG. 1 is a perspective view of the weighing machine according to the invention;

FIG. 2 is an enlarged plan view of an important part of the weighing machine as shown by FIG. 1, illustrating the relation between a height scale ring and a weight scale disc; and FIG. 3 is a circuit diagram in the weighing machine according to the invention.

DESCRIPTION OF PREFERRED EMBODIMENT

In a preferred embodiment as shown by FIGS. 1 to 3, a platform 11 on which an individual stands has a window 12 through which scales are read and is carried through a weighing mechanism on a base 13. The weighing mechanism may be that of prior art wherein the platform is supported on four arms which are, in turn, supported by respective coil springs, or is supported by two plate-like frames. The platform 11 is provided at its front end with a casing 14 projecting therefrom and this casing 14 has a blue lamp 15 arranged on the center of upper surface thereof, and two yellow lamps 16, 16 and two red lamps 17, 17 which are symmetrically arranged with predetermined distances from said blue lamp 15. The casing 14 is additionally provided on lower portion thereof with a battery casing 18. The blue, yellow and red lamps 15, 16 and 17 are respectively connected at their poles on one side to slidable contact plates 20, 21 and 22 of a height scale plate or ring 24 as will be described below (as shown by FIG. 3), and at their poles on other side to a battery 31. A weight scale disc 23 is arranged so as to be rotated together with a shaft 32 by the weighing mechanism (not shown) and to indicate a weight value through a weight scale 30 thereon and an indicator 29. The height scale ring 24 is arranged closely around the periphery of said weight scale disc 23 so as to be rotatable around the shaft 32 and bears a height scale 28 opposed to the weight scale 30 on the weight scale disc 23. The height scale ring 24 is provided on its periphery with teeth 27 meshing with a gear 26 which is integral with a knob 25 projecting from upper surface of the platform 11 through an opening therein. A movable contact 19 is secured on the under side of the weight scale disc 23 in the path of movement of the slidable contact plates 20, 21 and 22 which are secured on the height scale plates 24 so as to be rotatable together therewith as already described. An end 19' of the movable contact 19 which is bent and elastic is adapted to engage said slidable contact plates 20, 21 and 22 with an almost negligible friction as the weight scale disc 23 rotates.

Now a consideration should be taken for so-called optimum proportion between height and weight of a human body before the use of the weighing machine according to the invention is described. For the average Japanese, the optimum proportion is usually given by a relation, as follows:

(height given in cm − 100) × 0.9 = weight given in kg.

Such a relation may more or less depend on some factors such as races and states of particular countries. For Japanese, the relation indicates that the height of 160 cm preferably corresponds to the weight of 54 kg. The weighing machine according to the invention has the height scale 28 and the weight scale 30 on the scale ring 24 and the scale disc 23, respectively, in conformity with the conversion rate as given by the above relation. Lengths of the slidable contact plates 20, 21 and 22 correspond to the range of the weight scale 30 extending over ± 5 kg. so that, the blue lamp 15 is lit in the range of the optimum weight value ± 5 kg for a particular height value, indicating the particular weight value being substantially in the optimum range for the particular height value, the yellow lamps 16 16 are lit in the range of ± 5 kg to ± 10 kg from the optimum weight value, and the red lamps 17, 17 are lit in the range beyond ± 10 kg from the optimum weight value.

A person using the scale rotates the knob 25 until his or her own height on the height scale ring 24 is accurately aligned with the indicator 29 before weighing. Such a coordination also accomplishes movement of the slidable contact plates 20, 21 and 22. When an individual places his or her own weight on the platform 11, the scale disc 23 is rotated by an amount in proportion to the weight and indicates the weight value at the position of the indicator 29. Simultaneously the movable contact 19 is rotated together with the weight scale disc 23 and the end 19' thereof comes into contact with the slidable contact plate 20, 21 or 22 whereby the corresponding lamps are lit. In case of the optimum weight for a particular height said movable contact 19 is brought into contact with the slidable contact plate 20 and the blue lamp 15 is continuously lit. In case of the optimum weight value ± 5 kg, one of the yellow lamps 16, 16 symmetrically arranged with respect to the blue lamp 15 is lit. If the loaded scale disc 23 rotates in a counter-clockwise direction as viewed in FIG. 2, the left one of the yellow lamps 16, 16 is lit indicating over weight and the right one of the yellow lamps 16, 16 is lit indicating under weight. This is similar for the red lamps 17, 17. The range of comparatively indicating the weight and the height may be optionally selected by changing the contact range of each slidable contact plate 20, 21 and 22 in correspondence with the range of the weight scale disc 23.

With the weighing machine of the invention, as aforementioned, the weighed person may directly recognize the relationship between his or her weight and an ideal weight according to the particular lamp being lit all that is required is the preliminary operation of merely positioning the height scale plate according to his or her own height value.

Thus, according to the invention the weighing machine includes a height-indicating means which is adjustable to indicate the height of a given individual, a weighing means for indicating the weight of the individual, and an indicating means operatively connected with the height-indicating means and the weighing means and including a plurality of lamps one of which is lit when the weighing means indicates the weight of the individual for indicating by the lamp which is lit the relationship between the actual weight of the individual and his ideal weight.

What is claimed is:

1. A weighing machine comprising height-indicating means for indicating the height of a person using the weighing machine, weighing means for weighing a person, and relationship-indicating means operatively connected with said height-indicating means and said weighing means and including a plurality of lamps adapted to be lit according to the relative position between said height-indicating means and weighing means for indicating the relationship between the actual weight of an individual and his ideal weight.

2. A weighing machine according to claim 1, wherein said height-indicating means for indication of height is adjustable in coordination with a particular height of the weighed person.

3. A weighing machine according to claim 2, wherein a plurality of said lamps are arranged in a line and one of said lamps is lit according to a particular value given by the weighing means.

4. A weighing machine according to claim 2, wherein the height-indicating means comprises a height scale plate adapted to be rotated in concentric relation with a weight scale plate.

5. A weighing machine according to claim 3, wherein said plurality of lamps include a center lamp and are associated with said height-indicating means and are adapted to indicate any over or under weight relative to an optimum weight value for the particular height value depending upon the position of the lamp which is lit relative to the center lamp.

6. A weighing machine according to claim 4, wherein the height scale plate is provided with slidable contact plates in a line electrically connected with said plurality of lamps, respectively, and the weight scale plate is provided with a movable contact opposed to said slidable contact plates.

7. The combination of claim 1 and wherein an adjusting means is operatively connected with said height-indicating means for adjusting the latter according to the height of the person using the weighing machine, said relationship-indicating means including a series of first contacts respectively connected electrically with said lamps, and said weighing means including a second contact which moves with said weighing means when the latter indicates the weight of a person using the weighing machine, said first contacts being arranged in a row along the path of movement of said second contact so that a given one of said first contacts will be engaged by said second contact to illuminate one of said lamps for indicating the relationship between the weight of a person using the weighing machine and his ideal weight.

8. The combination of claim 7 and wherein said lamps include a central lamp and a plurality of additional lamps arranged before and after said central lamps symmetrically with respect thereto while said series of first contacts include a center first contact operatively connected with said central lamp, whereby the particular lamp which is illuminated will indicate said relationship according to its position with respect to the center lamp, the latter lamp indicating the ideal weight.

9. The combination of claim 8 and wherein said series of first contacts respectively have a length which will provide for illumination of one of said lamps within a given weight range.

* * * * *